(12) United States Patent
Li

(10) Patent No.: US 10,962,845 B1
(45) Date of Patent: Mar. 30, 2021

(54) DRIVING SYSTEM OF DISPLAY DEVICE, DRIVING METHOD AND DISPLAY DEVICE

(71) Applicant: Shenzhen China Star Optoelectronics Technology Co., Ltd., Shenzhen (CN)

(72) Inventor: Yuntao Li, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 326 days.

(21) Appl. No.: 16/318,366

(22) PCT Filed: Sep. 13, 2018

(86) PCT No.: PCT/CN2018/105576
§ 371 (c)(1),
(2) Date: Jan. 16, 2019

(87) PCT Pub. No.: WO2019/205432
PCT Pub. Date: Oct. 31, 2019

(30) Foreign Application Priority Data

Apr. 24, 2018 (CN) .......................... 201810374171.9

(51) Int. Cl.
*G06F 3/038* (2013.01)
*G09G 5/00* (2006.01)
(Continued)

(52) U.S. Cl.
CPC .......... *G02F 1/1345* (2013.01); *G09G 3/3611* (2013.01); *G09G 2310/08* (2013.01); *G09G 2330/02* (2013.01)

(58) Field of Classification Search
CPC ... G09G 2310/0267; G09G 2310/0275; G09G 2310/0278; G09G 3/2085; G09G 3/2096; G09G 3/22
See application file for complete search history.

(56) References Cited

U.S. PATENT DOCUMENTS 9,466,238 B2  10/2016  Seo
2016/0210890 A1*  7/2016  Lim ........................ G09G 3/20
2017/0193955 A1*  7/2017  Kim .................... H01L 29/7869

FOREIGN PATENT DOCUMENTS

CN  CN102112914 A  6/2011
CN  CN202693933 U  1/2013
(Continued)

*Primary Examiner* — Insa Sadio
(74) *Attorney, Agent, or Firm* — Leong C. Lei

(57) ABSTRACT

In a driving system of a display device, wires are arranged on a first connection unit, a second connection unit and a third connection unit and the traces are arranged on a first circuit board, a second circuit board and a third circuit board accordingly. The electrical path is established on the aforesaid circuit boards and the aforesaid connection units. One end of the electrical path is connected to the power supply voltage, and the other end is connected to the input end of a timing controller. When all the connection units are connected, the power supply voltage is inputted to the timing controller via the path, and the timing controller outputs the power supply control signal for controlling the display device to power on. When the connection units are poorly connected, the timing controller outputs a power supply stopping control signal to stop powering the display device.

10 Claims, 2 Drawing Sheets

(51) Int. Cl.
*G02F 1/1345* (2006.01)
*G09G 3/36* (2006.01)

(56) References Cited

FOREIGN PATENT DOCUMENTS

| | | |
|---|---|---|
| CN | CN103323963 A | 9/2013 |
| CN | CN105869591 A | 8/2016 |
| CN | CN107924663 A | 4/2018 |
| CN | CN108288459 A | 7/2018 |
| KR | KR20070027891 A | 3/2007 |

\* cited by examiner

DRIVING SYSTEM OF DISPLAY DEVICE, DRIVING METHOD AND DISPLAY DEVICE

FIELD OF THE INVENTION

The present invention relates to a display field, and more particularly to a driving system of a display device, a driving method and a display device.

BACKGROUND OF THE INVENTION

In the display skill field, the Liquid Crystal Display (LCD) and other panel displays have been gradually replaced the Cathode Ray Tube (CRT) displays. A liquid crystal display possesses advantages of being ultra thin, power saved and radiation free and has been widely utilized.

Most of the liquid crystal displays on the present market are back light type liquid crystal display devices, which comprise a liquid crystal display panel and a back light module. Generally, the liquid crystal display panel comprises a Color Filter (CF) substrate, a Thin Film Transistor (TFT) substrate, Liquid Crystal (LC) sandwiched between the CF substrate and the TFT substrate and sealant. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

The liquid crystal display device of prior art is generally provided with an X-board and a C-board. The X-board is electrically connected with the liquid crystal display panel of the liquid crystal display device, and the C-board is connected with the flexible flat cables (FFC). The C board is used to set components such as a timing controller, and the X board is used to set memory and other components. In the current liquid crystal display device, a plurality of X-boards are sequentially arranged in space, and the most middle two X-boards are directly connected to the C-board, and the adjacent X-boards are connected by flexible printed circuit board (FPC). With the continuous development of display technology, the liquid crystal display devices have been developed in the direction of large size, high resolution and high refresh rate. Consequentially, the number of flexible printed circuit boards for connecting X-boards used for electrical purposes and the number of flexible flat cables for connecting the C-board and the X-board are increasing. When the X-boards are connected by the flexible printed circuit boards, the flexible printed circuit board may have problems with poor connection due to bad insertion. When the C-board and the X-board are electrically connected through the flexible flat cables, the flexible flat cables may also have problems with poor connection due to the bad insertion. If the connection of the flexible flat cable and the flexible printed circuit board is not detected, and the liquid crystal display device just starts to work, the electronic component may be burned and melted due to poor connection, and the liquid crystal display device is damaged.

SUMMARY OF THE INVENTION

An objective of the present invention is to provide a drive system of a display device capable of avoiding the problem of burnout and melting of electronic components due to poor connection of connection units.

Another objective of the present invention is to provide a drive method of a display device capable of avoiding the problem of burnout and melting of electronic components due to poor connection of connection units.

One another objective of the present invention is to provide a display device capable of avoiding the problem of burnout and melting of electronic components due to poor connection of connection units.

For realizing the aforesaid objectives, the present invention first provides a driving system of a display device, comprising a first circuit board, two second circuit boards, two third circuit boards respectively corresponding to the two second circuit boards, two first connection units respectively corresponding to the two second circuit boards and connecting the corresponding second circuit boards with the corresponding third circuit boards thereof, two second connection units respectively corresponding to the two third circuit boards and connecting the corresponding third circuit boards to the first circuit board and third circuit boards, and two third connection units respectively corresponding to the two third circuit boards and connecting the corresponding third circuit boards to the first circuit board;

the first circuit board is disposed with a timing controller, a first pin, a first trace, a second trace and a third trace insulated with one another; a fourth trace is disposed on the second circuit board; a fifth trace, a sixth trace, and a seventh trace insulated with one another are disposed on the third circuit board; the first connection unit comprises a first wire and a second wire, of which two ends are respectively connected to the corresponding second circuit board and the corresponding third circuit board; the second connection unit comprises a third wire and a fourth wire, of which two ends are respectively connected to the corresponding third circuit board and the first circuit board; the third connection unit comprises a fifth wire and a sixth wire, of which two ends are respectively connected to the corresponding third circuit board and the first circuit board; the fourth trace of the second circuit board respectively connects the first wire and the second wire of the corresponding first connection unit to an end of the second circuit board; in each of the third circuit boards, the fifth trace respectively connects the first wire of the corresponding first connection unit and the fifth wire of the corresponding third connection unit to an end of the third circuit board, and the sixth trace respectively connects the second wire of the corresponding first connection unit and the third wire of the corresponding second connection unit to the end of the third circuit board; the seventh trace respectively connects the fourth wire of the corresponding second connection unit and the sixth wire of the corresponding third connection unit to the end of the third circuit board; in the first circuit board, the third wire, which connects the first pin to one of the two second connection units, is connected to the end of the first circuit board, and an input end of the timing controller connects the fourth wire of one of the two second connection units, which is connected to the first pin, to an end of the first circuit board, and the first trace respectively connects the fifth wires of the two third connection units to the end of the first circuit board, and the second trace respectively connects the sixth wires of the two third connection units to the end of the first circuit board, and the third trace respectively connects the third wire and the fourth wire of the other second connection units, except the one connected to the first pin, to the end of the first circuit board;

the first pin of the first circuit board is connected to a power supply voltage;

the timing controller is used to output a power supply control signal from an output end of the timing controller as a voltage inputted to the input end is greater than zero, and outputs a power supply stopping control signal from the output end of the timing controller as the voltage inputted to the input end is equal to zero.

The first wire and the second wire of the first connecting unit are respectively arranged on two sides of the first connecting unit;

the third wire and the fourth wire of the second connection unit are respectively arranged on two sides of the second connection unit;

the fifth wire and the sixth wire of the third connection unit are respectively arranged on two sides of the third connection unit.

The first connection unit, the second connection unit and the third connection unit are all flexible connection units.

The first connection unit is a flexible circuit board.

The second connection unit and the third connection unit are both flexible flat cables.

The power supply voltage is 3V to 5V.

The two third circuit boards are spaced, and each second circuit board is disposed on one side of the third circuit board corresponding thereto and is away from the other third circuit board.

The first circuit board further comprises a resistor, and one end of the resistor is electrically connected with the input end of the timing controller, and the other end of the resistor is grounded.

The present invention further provides a driving method of a display device, applied to the aforesaid driving system of the display device, comprising:

the output end of the timing controller outputting a power supply stopping control signal as the voltage of the input end of the timing controller is zero; and the output end of the timing controller outputting the power supply control signal as the voltage of the input end of the timing controller is greater than zero.

The present invention further provides a display device, comprising the aforesaid display system of the display device.

The benefits of the present invention are: in the driving system of the display device provided by the present invention, wires are arranged on the first connection unit, the second connection unit and the third connection unit and the traces are arranged on the first circuit board, second circuit board and third circuit board accordingly. The electrical path is established on the first circuit board, the second circuit board, the third circuit board, the first connection unit, the second connection unit and the third connection unit. One end of the electrical path is connected to the power supply voltage, and the other end is connected to the input end of the timing controller on the first circuit board. When all the connection units are connected, the power supply voltage is inputted to the timing controller via the path, and the timing controller outputs the power supply control signal for controlling the display device to power on. When the connection units are poorly connected, the voltage of the input end of the timing controller is zero, and the timing controller outputs a power supply stopping control signal to stop powering the display device, which can avoid the problem of burnout and melting of electronic components due to poor connection of connection units. The drive method of the display device provided by the present invention is capable of avoiding the problem of burnout and melting of electronic components due to poor connection of connection units. The display device provided by the present invention comprises the aforesaid driving system of the display device and is capable of avoiding the problem of burnout and melting of electronic components due to poor connection of connection units.

BRIEF DESCRIPTION OF THE DRAWINGS

In order to better understand the characteristics and technical aspect of the invention, please refer to the following detailed description and accompanying drawings of the present invention. However, the drawings are provided for reference only and are not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
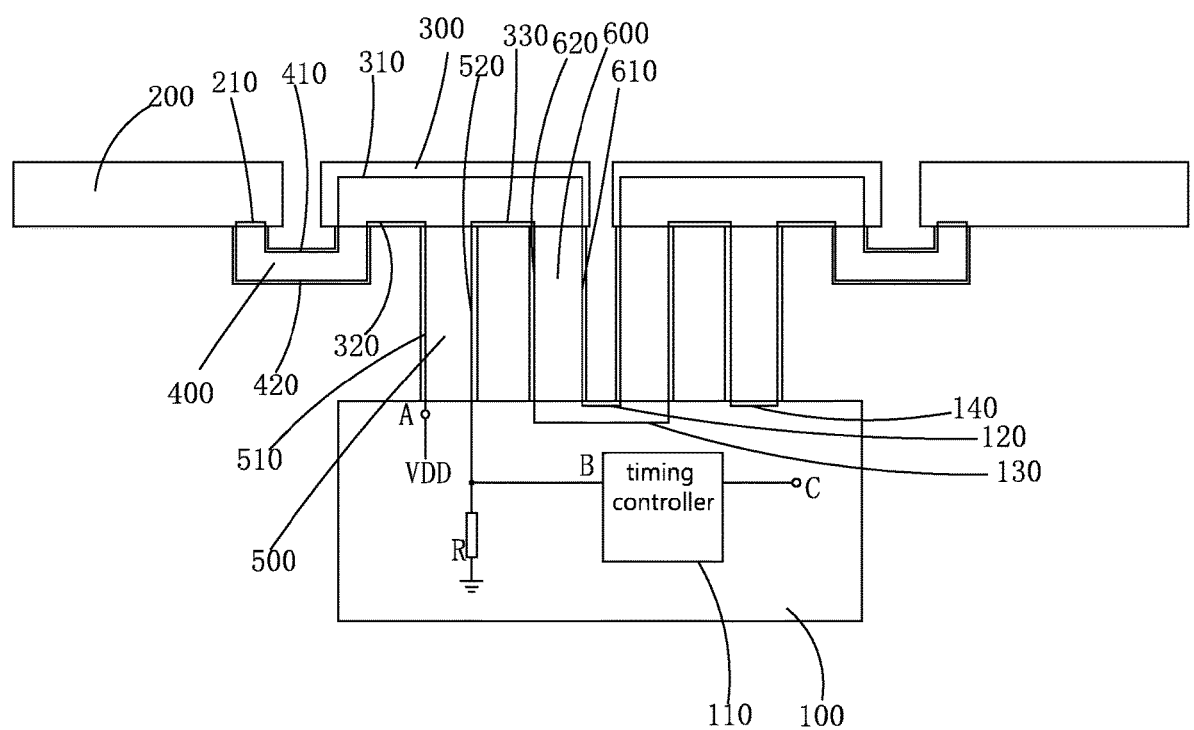
FIG. 1 is a structural diagram of a driving system of a display device according to the present invention.

Please refer to FIG. 1. The driving system of the display device according to the present invention comprises a first circuit board 100, two second circuit boards 200, two third circuit boards 300 respectively corresponding to the two second circuit boards 200, two first connection units 400 respectively corresponding to the two second circuit boards 200 and connecting the corresponding second circuit boards 200 with the corresponding third circuit boards 300 thereof, two second connection units 500 respectively corresponding to the two third circuit boards 300 and connecting the corresponding third circuit boards 300 to the first circuit board 100 and third circuit boards, and two third connection units 600 respectively corresponding to the two third circuit boards 300 and connecting the corresponding third circuit boards 300 to the first circuit board 100.

The first circuit board 100 is disposed with a timing controller 110, a first pin A, a first trace 120, a second trace 130 and a third trace 140 insulated with one another. A fourth trace 210 is disposed on the second circuit board 200. A fifth trace 310, a sixth trace 320, and a seventh trace 330 insulated with one another are disposed on the third circuit board 300. The first connection unit 400 comprises a first wire 410 and a second wire 420, of which two ends are respectively connected to the corresponding second circuit board 200 and the corresponding third circuit board 300. The second connection unit 500 comprises a third wire 510 and a fourth wire 520, of which two ends are respectively connected to the corresponding third circuit board 300 and the first circuit board 100. The third connection unit 600 comprises a fifth wire 610 and a sixth wire 620, of which two ends are respectively connected to the corresponding third circuit board 300 and the first circuit board 100. The fourth trace 210 of the second circuit board 200 respectively connects the first wire 410 and the second wire 420 of the corresponding first connection unit 400 to an end of the second circuit board 200. In each of the third circuit boards 300, the fifth trace 310 respectively connects the first wire 410 of the corresponding first connection unit 400 and the fifth wire 610 of the corresponding third connection unit 600 to an end of the third circuit board 300, and the sixth trace 320 respectively connects the second wire 420 of the corresponding first connection unit 400 and the third wire 510 of the corresponding second connection unit 510 to the end of the third circuit board 300, and the seventh trace 330 respectively connects the fourth wire 520 of the corresponding second connection unit 500 and the sixth wire 620 of the corresponding third connection unit 600 to the end of the third circuit board 300. In the first circuit board 100, the third wire 510, which connects the first pin A to one of the two second connection units 500, is connected to the end of the first circuit board 100, and an input end B of the timing controller 100 connects the fourth wire 520 of one of the two second connection units 500, which is connected to the first pin A, to an end of the first circuit board 100, and the first trace 120 respectively connects the fifth wires 610 of the two third connection units 600 to the end of the first circuit board 100, and the second trace 130 respectively connects the sixth wires 620 of the two third connection units 600 to the end of the first circuit board 100, and the third trace 140 respectively connects the third wire 510 and the fourth wire 520 of the other second connection units 500, except the one (the second connection units) connected to the first pin A, to the end of the first circuit board 100.

The first pin A of the first circuit board 100 is connected to a power supply voltage VDD.

The timing controller 110 is used to output a power supply control signal from an output end C of the timing controller as a voltage inputted to the input end B is greater than zero, and outputs a power supply stopping control signal from the output end C of the timing controller as the voltage inputted to the input end B is equal to zero.

Preferably, the first wire 410 and the second wire 420 of the first connecting unit 400 are respectively arranged on two sides of the first connecting unit 400 in order to prevent the first wire 410 and the second wire 420 from influencing the wiring of other lines in the first connection unit 400. The third wire 510 and the fourth wire 520 of the second connection unit 500 are respectively arranged on two sides of the second connection unit 500 in order to prevent the third wire 510 and the fourth wire 520 from influencing the wiring of other lines in the second connection unit 500. The fifth wire 610 and the sixth wire 620 of the third connection unit 600 are respectively arranged on two sides of the third connection unit 600 in order to prevent the fifth wire 610 and the sixth wire 620 from influencing the wiring of other lines in the third connection unit 600.

Specifically, the first connection unit 400, the second connection unit 500 and the third connection unit 600 are all flexible connection units.

Preferably, the first connection unit 400 is a flexible circuit board, and the second connection unit 500 and the third connection unit 600 are both flexible flat cables.

Specifically, in the embodiment shown in FIG. 1, the two third circuit boards 300 are spaced, and each second circuit board 200 is disposed on one side of the third circuit board 300 corresponding thereto and is away from the other third circuit board 300.

Specifically, the power supply voltage is 3V to 5V. Preferably, the power supply voltage is 3.3V.

Preferably, referring to FIG. 1, the first circuit board 100 further comprises a resistor R, and one end of the resistor R is electrically connected with the input end B of the timing controller 110, and the other end of the resistor is grounded.

Significantly, in the present invention, the first wire 410 and the second wire 420 are disposed on the first connection unit 400, and the third wire 510 and the fourth wire 520 are disposed on the second connection unit 500, the fifth wire 610 and the sixth wire 620 are disposed on the third connection unit 600. Meanwhile, the first pin A, the first trace 120, the second trace 130, and the third trace 140 are disposed on the first circuit board 100, and the fourth trace 210 is disposed on the second circuit board 200, and the fifth trace 310, the sixth trace 320 and the seventh trace 330 are disposed on the board 300 so that a connection path is formed between the first pin A and the input end B of the timing controller 110. As illustrated in the embodiment shown in FIG. 1, the path is formed by the third wire 510 of the second connection unit 500 on the left, the sixth wire 320 of the left third circuit board 300 on the left, the second wire 420 of the 400 on the left, the fourth wire 210 of the second circuit board 200 on the left, the first wire 410 of the first connection unit 400 on the left, the fifth wire 310 of the third circuit board 300 on the left, the fifth wire 610 of the third connection unit 600 on the left, the first wire 120 of the first circuit board 100, the fifth wire 610 of the third connection unit 600 on the right, the fifth wire 310 of the third circuit board 300 on the right, the first wire 410 of the first connection unit 400 on the right, the fourth wire 210 of the second circuit board 200 on the right, the second wire 420 of the first connection unit 400 on the right, the sixth trace 320 of the third circuit board 300 on the right, the third wire 500 of the second connection unit 500 on the right, the third trace 140 of the first circuit board 100, the fourth wire 520 of the second connection unit 500 on the right, the seventh wire 330 of the third circuit board 300 on the right, the sixth wire 620 of the third connection unit 600 on the right, the second wiring 130 of the first circuit board 100, the sixth wire 620 of the third circuit board 600 on the left, the seventh trace 330 of the third circuit board 300 on the left and the third wire 510 of the second circuit board 500 on the left are connected in sequence. When all the connection units and the corresponding circuit boards are connected perfectly, the connection path is on, and the power supply voltage VDD is inputted to the input end B of the timing controller 110 via the connection path, so that the voltage of the input end B of the timing controller 110 is greater than 0 at this moment. The difference between the power supply voltage VDD and the voltage of the input end B of the timing controller 110 is related to the equivalent resistance of the connection path. At this time, the timing controller 110 outputs the power supply control signal from the output end C thereof. The power supply signal is used to power on the display device. When at least one of the plurality of first connection units 400, second connection units 500 and third connection units 600 is in poor connection with the corresponding circuit board, the connection path will a break between the poorly connected connection unit and the circuit board. Therefore, the power supply voltage VDD cannot be transmitted to the input end B of the timing controller 110, so that the voltage of the input end B of the timing controller 110 is approximately zero, and the timing controller outputs a power supply stopping control signal. The power supply stopping control signal is used to control to stop powering on the display device. Thus, the display device can be powered on after ensuring that each connection unit is connected properly and it is capable of avoiding the problem of burnout and melting of electronic components due to poor connection of connection units.

Figure 2:
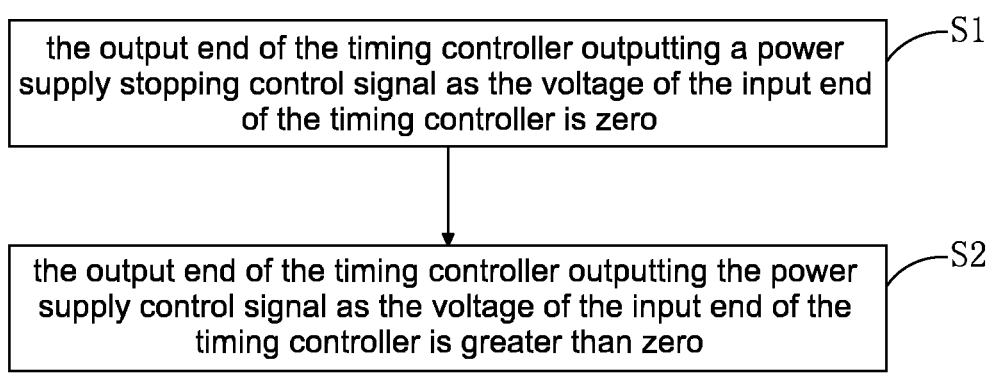
FIG. 2 is a flowchart of a driving method of a display device according to the present invention.

Please refer to FIG. 2. Based on the same inventive concept, the present invention further provides a driving method of a display device, applied to the aforesaid driving system of the display device. The structure of the drive system of the display device is not described repeatedly here, and the driving method of the display device comprises the following steps:

Step S1, the output end C of the timing controller 100 stopping outputting the power supply control signal to control the display stopping powering on as the voltage of the input end B of the timing controller 110 is zero since there is a problem of poor connection between at least one of the first connection unit 400, the second connection unit 500, and the third connection unit 600 and the corresponding circuit board.

Step S2, the output end C of the timing controller 100 outputting the power supply control signal to control the display powering on as the voltage of the input end B of the timing controller 110 is greater than zero since the connection between at least one of the first connection unit 400, the second connection unit 500, and the third connection unit 600 and the corresponding circuit board is good.

The driving method of the display device according to the present invention is applied to the aforesaid driving system of the display device that the display device can be powered on after ensuring that each connection unit is connected properly and capable of avoiding the problem of burnout and melting of electronic components due to poor connection of connection units.

Based on the same inventive concept, the present invention further provides a display device, comprising the aforesaid driving system of the display device. The drive system of the display device is not described repeatedly here.

Specifically, the display device is a liquid crystal display device.

The display device according to the present invention comprises the aforesaid driving system of the display device that the display device can be powered on after ensuring that each connection unit is connected properly and capable of avoiding the problem of burnout and melting of electronic components due to poor connection of connection units.

In conclusion, in the driving system of the display device of the present invention, wires are arranged on the first connection unit, the second connection unit and the third connection unit and the traces are arranged on the first circuit board, second circuit board and third circuit board accordingly. The electrical path is established on the first circuit board, the second circuit board, the third circuit board, the first connection unit, the second connection unit and the third connection unit. One end of the electrical path is connected to the power supply voltage, and the other end is connected to the input end of the timing controller on the first circuit board. When all the connection units are connected, the power supply voltage is inputted to the timing controller via the path, and the timing controller outputs the power supply control signal for controlling the display device to power on. When the connection units are poorly connected, the voltage of the input end of the timing controller is zero, and the timing controller outputs a power supply stopping control signal to stop powering the display device, which can avoid the problem of burnout and melting of electronic components due to poor connection of connection units. The drive method of the display device according to the present invention is capable of avoiding the problem of burnout and melting of electronic components due to poor connection of connection units. The display device according to the present invention, comprising the aforesaid driving system of the display device, is capable of avoiding the problem of burnout and melting of electronic components due to poor connection of connection units.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A driving system of a display device, comprising a first circuit board, two second circuit boards, two third circuit boards respectively corresponding to the two second circuit boards, two first connection units respectively corresponding to the two second circuit boards and connecting the corresponding second circuit boards with the corresponding third circuit boards thereof, two second connection units respectively corresponding to the two third circuit boards and connecting the corresponding third circuit boards to the first circuit board and third circuit boards, and two third connection units respectively corresponding to the two third circuit boards and connecting the corresponding third circuit boards to the first circuit board;

the first circuit board is disposed with a timing controller, a first pin, a first trace, a second trace and a third trace insulated with one another; a fourth trace is disposed on the second circuit board; a fifth trace, a sixth trace, and a seventh trace insulated with one another are disposed on the third circuit board; the first connection unit comprises a first wire and a second wire, of which two ends are respectively connected to the corresponding second circuit board and the corresponding third circuit board; the second connection unit comprises a third wire and a fourth wire, of which two ends are respectively connected to the corresponding third circuit board and the first circuit board; the third connection unit comprises a fifth wire and a sixth wire, of which two ends are respectively connected to the corresponding third circuit board and the first circuit board; the fourth trace of the second circuit board respectively connects the first wire and the second wire of the corresponding first connection unit to an end of the second circuit board; in each of the third circuit boards, the fifth trace respectively connects the first wire of the corresponding first connection unit and the fifth wire of the corresponding third connection unit to an end of the third circuit board, and the sixth trace respectively connects the second wire of the corresponding first connection unit and the third wire of the corresponding second connection unit to the end of the third circuit board; the seventh trace respectively connects the fourth wire of the corresponding second connection unit and the sixth wire of the corresponding third connection unit to the end of the third circuit board; in the first circuit board, the third wire, which connects the first pin to one of the two second connection units, is connected to the end of the first circuit board, and an input end of the timing controller connects the fourth wire of one of the two second connection units, which is connected to the first pin, to an end of the first circuit board, and the first trace respectively connects the fifth wires of the two third connection units to the end of the first circuit board, and the second trace respectively connects the sixth wires of the two third connection units to the end of the first circuit board, and the third trace respectively connects the third wire and the fourth wire of the other second connection units, except the one connected to the first pin, to the end of the first circuit board;

the first pin of the first circuit board is connected to a power supply voltage;

the timing controller is used to output a power supply control signal from an output end of the timing controller as a voltage inputted to the input end is greater than zero, and outputs a power supply stopping control signal from the output end of the timing controller as the voltage inputted to the input end is equal to zero.

2. The driving system of the display device according to claim 1, wherein the first wire and the second wire of the first connecting unit are respectively arranged on two sides of the first connecting unit;

the third wire and the fourth wire of the second connection unit are respectively arranged on two sides of the second connection unit;

the fifth wire and the sixth wire of the third connection unit are respectively arranged on two sides of the third connection unit.

3. The driving system of the display device according to claim 1, wherein the first connection unit, the second connection unit and the third connection unit are all flexible connection units.

4. The driving system of the display device according to claim 3, wherein the first connection unit is a flexible circuit board.

5. The driving system of the display device according to claim 3, wherein the second connection unit and the third connection unit are both flexible flat cables.

6. The driving system of the display device according to claim 1, wherein the power supply voltage is 3V to 5V.

7. The driving system of the display device according to claim 1, wherein the two third circuit boards are spaced, and each second circuit board is disposed on one side of the third circuit board corresponding thereto and is away from the other third circuit board.

8. The driving system of the display device according to claim 1, wherein the first circuit board further comprises a resistor, and one end of the resistor is electrically connected with the input end of the timing controller, and the other end of the resistor is grounded.

9. A driving method of a display device, applied to the driving system of the display device according to claim 1, comprising:

the output end of the timing controller outputting a power supply stopping control signal as the voltage of the input end of the timing controller is zero; and the output end of the timing controller outputting the power supply control signal as the voltage of the input end of the timing controller is greater than zero.

10. A display device, comprising the driving system of the display device according to claim 1.

* * * * *